United States Patent Office 3,275,540
Patented Sept. 27, 1966

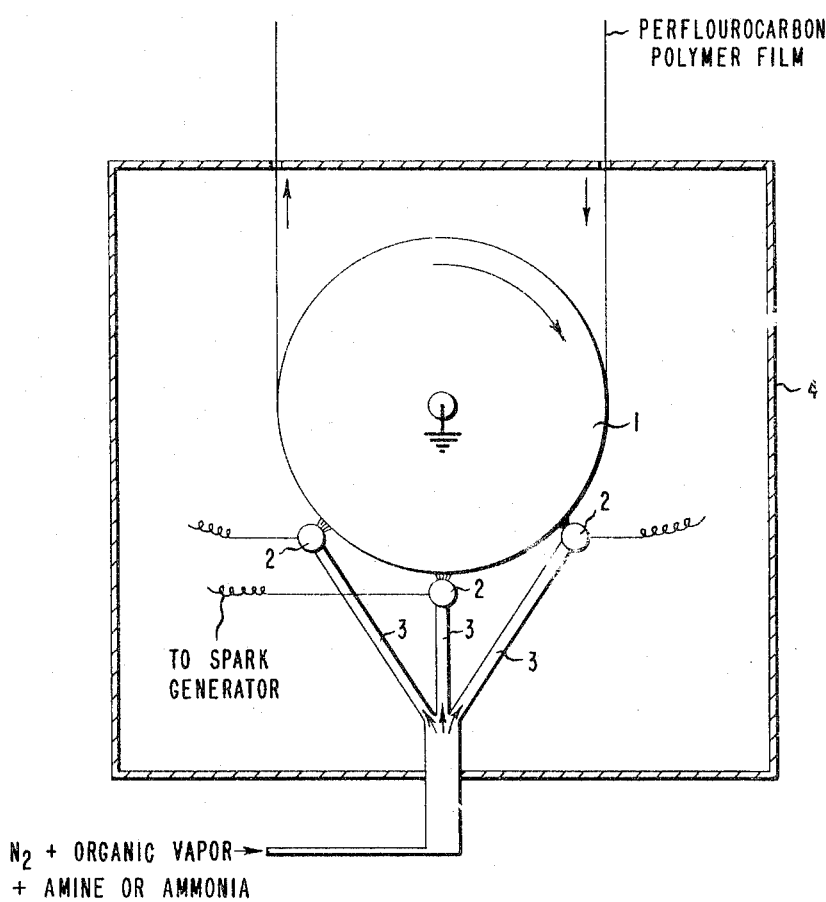

3,275,540
SURFACE TREATMENT OF SHAPED ORGANIC
POLYMERIC STRUCTURES
Richard T. McBride, Buffalo, N.Y., assignor to E. I. du
Pont de Nemours and Company, Wilmington, Del., a
corporation of Delaware
Filed Oct. 1, 1963, Ser. No. 313,080
5 Claims. (Cl. 204—165)

This invention relates to polymeric shaped structures and more particularly to a process for rendering adherable the surface of such structures.

It is well known to take advantage of the properties of various polymeric shaped structures such as films by adhering them to other materials. For example, the perfluorocarbon polymers are very resistant to most chemicals and solvents and they are used as liners for pipes and vessels in which corrosive chemicals are transported or stored.

A difficulty encountered in forming many structures of this type is that of poor adhesion; the perfluorocarbon polymers, for example, suffer from an extremely low degree of adherability to practically all materials including low adherability to other perfluorocarbon polymeric structures. The use of common adhesives does not provide adequate bonding of these polymers to other materials and little if any adherability is imparted by the use of an electrical discharge treatment such as is described in British 715,914, which treatment is known to improve adhesion of inks and other materials to various polymeric structures.

It has been found that an appreciable improvement in adherability can be realized in a process wherein the surface of the polymeric film is treated in an electrical discharge in an atmosphere of an organic vapor such as described in patent application Serial No. 282,947 filed on May 24, 1963 by Richard T. McBride and Leon E. Wolinski and patent application Serial No. 92,330 filed on February 28, 1961, now abandoned, by Leon E. Wolinski. Even with this treating process, however, it is found that the adherability of a perfluorocarbon surface is not sufficiently great for readily bonding the treated film to such surfaces as metal foils and certain organic polymer films and rather extreme laminating conditions are required.

It is therefore an object of this invention to provide a process for the surface treatment of preformed structures whereby to render the surfaces strongly adherable to other materials. It is a further object to provide a process for the surface treatment of preformed structures of perfluorocarbon polymers whereby to render the surfaces readily and strongly adherable to metal foils and other polymeric films. A still further object is to provide a continuous process for rendering the surface of a film of a copolymer of tetrafluoroethylene and hexafluoropropene readily and strongly adherable to metal foils and other film surfaces. The foregoing and related objects will more clearly appear from the following description and examples.

These objects are realized by the present invention which, briefly stated, comprises subjecting the surface of an organic polymeric shaped structure to the action of an electrical discharge at substantially atmospheric pressure between spaced positive and negative electrodes maintained at a voltage differential in excess of about 1000 volts, said electrical discharge having an energy level below 15 electron volts, in an atmosphere of a mixture of vapors comprising essentially the vapor of a compound selected from the group consisting of ammonia and amines wherein the amino group is the sole functional group and the vapor of an organic compound other than an amine wherein the amino group is the sole functional group of the compound, said organic compound having a vapor pressure of at least 0.25 mm. of mercury at 60° C., whereby to render said surface strongly adherable to other materials.

In the preferred embodiment of this invention, illustrated diagrammatically in the accompanying drawing, a continuous web of preformed self-supporting film of a perfluorocarbon polymer is continuously passed between a set of spaced electrodes consisting of a rotating metal roll 1 which is connected electrically to ground, and one or more stationary hollow metal tubes 2 disposed parallel to the longitudinal axis of the roll and spaced a distance of from 0.03 to 0.125 of an inch from the surface thereof. The tubes are each connected electrically to a suitable power source which supplies to each tube electrode an alternating (or pulsating direct) current of from 0.3 to 5.5 R.M.S. (root mean square) amperes at a voltage in the range of 10,000 to 30,000 volts, with pulsating peak voltages up to 100,000 volts, and at a frequency of at least 350 cycles per second and preferably in the range of 300,000 to 500,000 cycles per second. The power to the electrodes ranges from 10 watts/lineal inch of electrode length to 100 watts/lineal inch, and the exposure time is not less than $4 \times 10^{-4}$ second. A mixture of vapors ammonia or an amine, e.g., diethylene triamine, and vapors of a non-oxidizing organic compound, e.g., glycidyl methacrylate, is continuously fed to the hollow interior of the electrode tubes through distributor ducts 3 and issues from the tubes at the gap between each tube and the roll through suitable openings along the length of the tubes, whereby the electrical discharge between the electrodes takes place at atmospheric pressure in a non-oxidizing atmosphere containing the mixed vapors. The assembly just described is suitably enclosed in a chamber 4, provided with the necessary openings, to facilitate maintenance of an oxygen gas-free atmosphere in the treating zone, and controlled exhaust of the mixture of nitrogen and organic vapors therefrom, and to minimize operational hazards. The vapors may also be introduced into the reaction zone through one or more tubes separate from the electrode assembly. It should be understood that the film may be treated at normal room temperatures (25° C.) or at elevated film temperatures up to 150° C. In general the permanency of the effect of the treatment, i.e. adherability, is enhanced by maintaining the film at a temperature substantially above room temperature during treatment, e.g., at a temperature of from 30° to 95° C.

With respect to the amines which may form a component of the vaporous atmosphere in which the electrical discharge treatment is carried out, it is required that the amine be one which vaporizes (at atmospheric pressure) at or below the temperature at which the treatment is carried out and that it be devoid of other functional groups. Typical amines suitable for purposes of this invention include methyl amine, dimethyl amine, trimethyl amine, ethyl amine, diethyl amine, triethyl amine, propyl amine, butyl amine, amyl amine, hexyl amine, cyclohexyl amine, decyl amine, methyl ethyl amine, tertiary butyl amine, ethylene diamine, propylene diamine, butylene diamine, diethylene triamine, dipropylene triamine, triethylenetetramine, tetraethylene pentamine and similar polyamines.

As the organic compound component of the vaporous atmosphere there may be employed any organic compound, other than an amine as defined hereinabove, which has a vapor pressure of at least 0.25 mm. of mercury at 60° C. While polymerizable, organic substances are preferred, non-polymerizable organic monomers as well as polymerizable compounds may be used. As typical examples of suitable compounds that may be mentioned are glycidyl methacrylate, methyl methacrylate, acrylonitrile, styrene, parachlorostyrene, vinyl butyl ether, methyl vinyl ketone, vinyl acetate, 1-hexene, N-vinyl-2-pyrrolidone, xylene, hexane, cyclohexane, carbon tetrachloride, chloroform, tetrahydrofuran, diethylsulfone and tetraisopropyl titanate. The preferred organic compounds for the electrical discharge atmosphere are compounds which are non-oxidizing under the conditions of the treatment, such as glycidyl methacrylate.

Vapors of the vaporizable organic compound and amine are conveniently introduced into the treating zone by bubbling nitrogen through the liquid to be vaporized at a rate of one-half cubic foot/minute up to 10 cubic feet/minute. No adverse effects have been observed in the use of higher flow rates though economic considerations would dictate against use of amounts exceeding those required to produce the desired results. Preferably the vapors of organic compound and ammonia or amine are introduced separately into the treating zone. The vapors of organic compound and ammonia can be introduced separately or together and in some cases ammonia can be used as the carrier for the organic vapor. The proportion of the vapor of the amine to the vapor of the organic compound may vary from 5/95 to 95/5; ratios in the order of 30/70 to 70/30 are preferred. Ratio of ammonia to the vapor of the organic compound may be somewhat higher, up to about 99/1.

The difference in potential between the positive and negative electrodes may vary from low voltages in the order of 1000 volts up to pulsating voltages of 100,000 or more. In general, it is preferred to maintain the voltage in excess of 2000–3000 volts.

Frequencies may range from 350 cycles/second up to 500,000 cycles per second and above. Frequencies in the range of 300,000 to 500,000 cycles per second are preferred in order to obtain effective treatment at commercially acceptable exposure times.

In general, the effectiveness of the treatment increases with amount of current to the electrodes for a given area of electrode and time of exposure. Current to the electrodes may range up to 5.5 R.M.S. (root mean square) amperes or higher. However, it is preferred to operate in the range of 0.3 R.M.S. amperes to 3.5 R.M.S. amperes to give reasonable treating times on the one hand, and to avoid rapid degradation of the electrodes at too high currents on the other hand. Power to the high frequency generator may range from 10 watts per lineal inch of the electrode length to 1800 watts per lineal inch of the electrode length. The electrical discharge employed herein, operating within the parameters above specified, has an energy level below 15 electron volts, and is not to be confused with the high or intermediate energy irradiations heretofore used to treat polymeric surfaces.

The electrodes are preferably spaced from about 0.03 inch to about 0.125 inch apart. Useful results can be obtained when the electrode gap is as low as 0.015 inch to as much as 0.25 inch provided suitable adjustments in such features as amount of current, electrode dimension and exposure time are made.

Time of exposure to the electrical discharge treatment is not especially critical and effective treatments are realized at exposure times as short as $1 \times 10^{-5}$ second and no adverse effects are noted at times as long as 60 seconds. Preferably, the exposure time should be not less than $4 \times 10^{-4}$ second.

The process of this invention is particularly advantageous for, and will be hereinafter described with specific reference to, the surface treatment of preformed structures, and particularly sheet structures, of perfluorocarbon polymers such as copolymers of tetrafluoroethylene and hexafluoropropene having from 50% to 95% by weight of tetrafluoroethylene (U.S.P. 2,833,686). However, the process herein disclosed is also applicable to other thermoplastic perfluorocarbon structures as well as to structures of polyolefins, polyesters, polyamides, etc.

The following examples will serve to further illustrate the principles and practice of this invention.

EXAMPLE 1

A. A film 10 mils thick and 15 inches wide melt extruded through a hopper slot at 385° C. from a tetrafluoroethylene/hexafluoropropene copolymer (weight ratio 85/15) was drawn through the electrical discharge apparatus of the type illustrated in FIGURE 1 at a rate of 6 feet per minute. The temperature of the film being drawn through the apparatus was 56° C. The apparatus equipped with three stationary hollow tube electrodes each of which was connected to a Lepel High Frequency Spark Generator Model HFSG. The setting on the unit was 55 for each electrode. Vapors of glycidyl methacrylate and diethylene triamine in nitrogen gas carrier were introduced separately at atmospheric pressure through the hollow tubes at a flow rate of about 4 cubic feet/minute.

B. After treatment the film was laminated to bright copper foil at 290° C. under a pressure of 10 p.s.i. The resulting laminate showed a peel bond strength of 5000 grams/inch of film width on a Suter Tester at a pull rate of 12 inches/minute and a peel angle of 180°. A control film made as described above but without the diethylene triamine vapor in the electrical discharge when made to a laminate with bright copper showed a bond strength of approximately 2500 grams/inch.

C. In a similar manner the treated film and a polyimide film 2 mils thick prepared as described in U.S. application Serial No. 169,120, filed on January 26, 1962, now U.S. Patent No. 3,232,106 by W. M. Edwards, was laminated in a hot nip roll laminator at 288° C. at a speed of 10 feet/minute. The resulting laminate showed a bond strength of 1200 grams/inch whereas a film treated in an atmosphere of glycidyl methacrylate only in the electrical discharge without the added diethylene triamine showed a maximum bond strength of 700 grams in a parallel control test.

EXAMPLE 2

Following the general procedure of Example 1, the tetrafluoroethylene/hexafluoropropene copolymer film was treated in an electrical discharge in an atmosphere of glycidyl methacrylate and ammonia introduced separately into the hollow electrode tubes. The resulting treated film was laminated to a primed aluminum sheet using an ammoniated butyl methacrylate/methyl methacrylate/glycidyl methacrylate copolymer adhesive (66/30/4) to give a laminate with excellent boiling water resistance. A typical laminate which initially showed bond strengths in the order of 3000 to 4200 grams/inch showed bond strengths of an average of 2500 grams/inch after 185 hours of boiling. A control film wherein the ammonia was omitted in the electrical discharge treatment showed a similar initial bond strength but no bond strength whatever after only 15 hours boiling. A test laminate made from a copolymer film treated in the electrical discharge in an atmosphere of a mixture of ethylene diamine and glycidyl methacrylate was also boil-resistant; a similar laminate made from a copolymer film treated in the electrical discharge in an atmosphere of ethylene diamine alone was not boil-resistant.

EXAMPLES 3–10

Following the general procedure described in Example 1, the copolymer film described in Example 1 was treated in the electrical discharge under the gaseous atmospheres indicated in the table below. The resulting treated films were bonded to bright copper and the degree of adhesion to the copper foil was determined. The results are shown in the table below.

TABLE I

| Example | Vapors in Electrical Discharge | | Peel Bond to Copper, Grams/inch |
| --- | --- | --- | --- |
| | Organic Compound | Amine | |
| 3 | Methyl methacrylate | Triethylene tetramine | 5,000 |
| 4 | Methyl vinyl ketone | Tetraethylene pentamine | 4,500 |
| 5 | Vinyl acetate | Decyl amine | 4,200 |
| 6 | Tetrahydrofuran | Tertiary butyl amine | 4,000 |
| 7 | Xylene | Methylisopropyl amine | 4,500 |
| 8 | Vinyl butyl ether | Propylene diamine | 5,000 |
| 9 | Acrylonitrile | Ethylene diamine | 4,800 |
| 10 | Carbon tetrachloride | Triethyl amine | 5,000 |

In all cases, it was observed that when the film was treated with the specific organic compounds shown in the column at the left without the amine shown in the second column the adhesion values were approximately ½ of the value obtained when both the organic vapor and the amine were present in the electrical discharge. Moreover, when the film was treated in the electrical discharge in the atmosphere of either the organic compound or of the amine alone and then made into a laminate with aluminum or copper foil following the procedure described in Example 2, a boil-resistant bond was not obtained.

I claim:
1. A process for rendering surfaces of shaped structures of organic polymeric materials strongly adherent to other materials which comprises subjecting the surface of an organic polymeric shaped structure to the action of an electrical discharge at substantially atmospheric pressure between spaced positive and negative electrodes maintained at a voltage differential in excess of about 1000 volts, said electrical discharge having an energy level below 15 electron volts, in an atmosphere of a mixture of vapors comprising essentially the vapor of a compound selected from the group consisting of ammonia and amines wherein the amino group is the sole functional group and the vapor of an organic compound other than an amine wherein the amino group is the sole functional group of the compound, said compound having a vapor pressure of at least 0.25 mm. of mercury at 60° C., whereby to render said surface strongly adherable to other materials.

2. The process of claim 1 wherein the shaped structure is a structure of a perfluorocarbon polymer.

3. A process for rendering the surface of a film of a perfluorocarbon polymer adherent to other materials which comprises subjecting the surface of a film of perfluorocarbon to the action of an electrical discharge at substantially atmospheric pressure between spaced positive and negative electrodes maintained at a voltage differential in excess of about 1000 volts, said electrical discharge having an energy level below 15 electron volts, in an atmosphere consisting essentially of the vapor of a compound selected from the group consisting of ammonia and amines wherein the amino group is the sole functional group and the vapor of a non-oxidizing organic compound other than an amine wherein the amino group is the sole functional group of the compound, said compound having a vapor pressure of at least 0.25 mm. of mercury at 60° C.

4. The process of claim 3 wherein the perfluorocarbon polymer is a copolymer of tetrafluoroethylene and hexafluoropropene.

5. The process of claim 3 wherein the atmosphere consists essentially of vapors of diethylene triamine and glycidyl methacrylate.

References Cited by the Examiner
UNITED STATES PATENTS 3,030,290 4/1962 Ryan _____ 204—169
3,068,510 12/1962 Coleman _____ 204—165

FOREIGN PATENTS 845,897 8/1960 Great Britain.

JOHN H. MACK, Primary Examiner.

H. S. WILLIAMS, Assistant Examiner.